United States Patent Office 2,961,449
Patented Nov. 22, 1960

2,961,449

2-FURFURYLPROPIONYL UREA AND 2-FURFURYLBUTYRYL UREA

Robert B. Moffett, Harold G. Kolloff, and William B. Bass, Kalamazoo, Mich., assignors to The Upjohn Company, Kalamazoo, Mich., a corporation of Michigan No Drawing. Filed Dec. 12, 1957, Ser. No. 702,264

3 Claims. (Cl. 260—347.3)

The present invention relates to new organic compounds and more especially relates to (2-furfurylpropionyl)urea and (2-furfurylbutyryl)urea.

The novel compounds of this invention are central nervous system depressants and, more specifically, are useful as sedatives which are substantially devoid of hypnotic properties.

The novel compounds of this invention can be combined with solid or liquid pharmaceutical carriers and formulated into the form of tablets, powder packets, or capsules, or dissolved or suspended in suitable solvents, for oral or parenteral administration.

The novel compounds of this invention can be prepared by known processes for acylating urea; for example, by reacting urea with a 2-furfurylpropionyl or a 2-furfurylbutyryl acylating agent such as the free acids, the acid anhydrides, the acid halides, and the like. It is of advantage to react 2-furfurylpropionyl halide or 2-furfurylbutyryl halide with an excess of urea in an inert organic solvent such as benzene, toluene, hexane, ethers, halogenated hydrocarbons, and the like. Particularly good yields and economy are obtained with from two to four moles of urea for each mole of the acid halide. Any greater or lesser amount can be used, however, without changing the identity of the product.

A preferred method is to treat 2-furfurylpropionic acid or 2-furfurylbutyric acid in ether solution with an excess of thionyl chloride forming the corresponding acid chloride, removing the excess thionyl chloride and solvent by distillation under reduced pressure, and then purifying the acid chloride by distillation under reduced pressure. The acid chloride thus produced is then reacted with an excess of urea in dry benzene to produce (2-furfurylpropionyl)urea or (2-furfurylbutyryl)urea.

The following examples are illustrative of the production of the compounds of the present invention, but are not to be construed as limiting.

EXAMPLE 1

*Preparation of (2-furfurylbutyryl)urea*

(A) DIETHYL FURFURYLETHYLMALONATE

In a one-liter, round-bottom flask, fitted with a stirrer, dropping funnel, and condenser was placed 250 milliliters of toluene. About fifty milliliters of the toluene was distilled to dry the system and 23 grams (one mole) of sodium was added. The sodium was melted by heating the toluene to the reflux temperature and then 188.2 grams (one mole) of diethyl ethylmalonate was added with vigorous stirring at such a rate that the refluxing continued smoothly. When all the sodium had reacted the solution was cooled to room temperature under an atmosphere of nitrogen and a solution of 95 grams (0.8 mole) of furfuryl chloride in 130 milliliters of toluene was added in a slow stream with vigorous stirring. The mixture was stirred for three hours more and allowed to stand overnight at room temperature. The reaction mixture was washed three times with water and then with saturated aqueous sodium chloride solution. The washings were combined and extracted with ether. The toluene and ether solutions were combined and the resulting solution was distilled to remove the solvents. The residue was then distilled through a twelve-inch column packed with one-eighth inch helices. After removing a small forerun the product distilled smoothly at 123 to 125 degrees centigrade at 2.5 millimeters of mercury, giving 162.1 grams (75.6 percent yield) of diethyl furfurylethylmalonate as a colorless liquid fraction; $N_D^{25}$ 1.4551.

(B) 2-FURFURYLBUTYRIC ACID

A mixture of 161 grams (0.6 mole) of diethyl furfurylethylmalonate, 200 milliliters of fifty percent aqueous sodium hydroxide solution, 200 milliliters of ethanol, and 100 milliliters of water was heated under reflux with stirring for seventeen hours. After standing for two days the mixture was acidified with hydrochloric acid, diluted with enough water to dissolve the precipitated sodium chloride, and extracted three times with ether. The combined ether solution was washed twice with water, then with saturated aqueous sodium chloride solution. After removal of the ether by distillation, the residue was heated to 180–200 degrees centigrade for ten minutes and cooled under an atmosphere of nitrogen. The resulting yellow oil was dissolved in dilute aqueous sodium hydroxide solution, and the resulting solution was extracted with ether and then acidified with dilute hydrochloric acid. The mixture was extracted three times with ether and the combined ether solution was washed twice with water, then with saturated aqueous sodium chloride solution, and dried over anhydrous sodium sulfate. After removal of the ether by distillation, the residue was distilled through a six-inch column packed with one-eighth inch helices, giving 77.7 grams (77.2 percent yield) of 2-furfurylbutyric acid as a colorless liquid fraction boiling at 120 degrees centigrade at three millimeters of mercury; $N_D^{25}$ 1.4674.

(C) 2-FURFURYLBUTYRYL CHLORIDE

A solution of 16.8 grams (0.1 mole) of 2-furfurylbutyric acid, twenty milliliters of ether, three drops of pyridine, and eleven milliliters (0.15 mole) of thionyl chloride was allowed to stand at room temperature for 3.5 hours. In became very dark and sulfur dioxide and gaseous hydrogen chloride were evolved. Part of the solvent was removed by distillation at atmospheric pressure during ten minutes at a temperature (in the liquid) of forty degrees centigrade. Then the solution was distilled under reduced pressure through a six-inch column packed with one-eighth inch helices. After removing the rest of the solvent and a small forerun, the acid chloride distilled at 33 to 47 degrees centigrade at 0.1 millimeter of mercury, fifteen grams of 2-furfurylbutyryl chloride being thus obtained.

(D) (2-FURFURYLBUTYRYL)UREA

A mixture of eighteen grams (0.3 mole) of urea and forty milliliters of benzene was distilled until ten milliliters of solvent was collected, to remove traces of water. After cooling the mixture to room temperature, fifteen grams of 2-furfurylbutyryl chloride was added, and the flask was stoppered and shaken at room temperature for sixteen hours. Then the mixture was heated under reflux with stirring for two hours. After cooling to room temperature the mixture was well triturated with five percent aqueous sodium bicarbonate solution, and the undissolved solid was recovered by filtration, washed with water, then with pentane, and dried in a vacuum desiccator, giving thirteen grams (62 percent yield) of (2-furfurylbutyryl)urea, melting at 166 to 169 degrees centigrade.

The thirteen grams of (2-furfurylbutyryl)urea was dissolved in 150 milliliters of hot ethanol, and the solution was filtered hot and allowed to cool slowly to room temperature. The (2-furfurylbutyryl)urea crystallized from solution and was filtered and dried in a vacuum oven at forty degrees centigrade, giving 6.3 grams of nearly white (2-furfurylbutyryl)urea melting at 166 to 168 degrees centigrade.

*Analysis.*—Calculated for $C_{10}H_{14}N_2O_3$: C, 57.13; H, 6.71; N, 13.33. Found: C, 57.03; H, 6.89; N, 13.16.

EXAMPLE 2

*Preparation of (2-furfurylpropionyl)urea*

(A) DIETHYL FURFURYLMETHYLMALONATE

Substituting diethyl methylmalonate for diethyl ethylmalonate and using the same procedure as in Example 1, part A, diethyl furfurylmethylmalonate was obtained as a colorless fraction boiling at 140 degrees centigrade at 11.5 millimeters of mercury; $N_D^{25}$ 1.4531.

*Analysis.*—Calculated for $C_{13}H_{18}O_5$: C, 61.40; H, 7.13. Found: C, 61.55; H, 7.07.

(B) 2-FURFURYLPROPIONIC ACID

Substituting the above-prepared diethyl furfurylmethylmalonate for diethyl furfurylethylmalonate and using the same procedure as in Example 1, part B, 2-furfurylpropionic acid was obtained as a colorless liquid fraction boiling at 108 degrees centigrade at two millimeters of mercury; $N_D^{25}$ 1.4690.

*Analysis.*—Calculated for $C_8H_{10}O_3$: C, 62.32; H, 6.52; neut. eq., 154.16. Found: C, 62.43; H, 6.51; neut. eq., 156.8.

(C) 2-FURFURYLPROPIONYL CHLORIDE

Substituting the above-prepared 2-furfurylpropionic acid for 2-furfurylbutyric acid and using the same procedure as in Example 1, part C, 2-furfurylpropionyl chloride was obtained as a liquid fraction boiling at fifty degrees centigrade at one millimeter of mercury.

(D) (2-FURFURYLPROPIONYL)UREA

Substituting the above-prepared 2-furfurylpropionyl chloride for 2-furfurylbutyryl chloride and using the same procedure as in Example 1, part D, (2-furfurylpropionyl)urea was obtained as a white crystalline solid melting at 161 to 162 degrees centigrade.

*Analysis.*—Calculated for $C_9H_{12}N_2O_3$: C, 55.09; H, 6.17; N, 14.28. Found: C, 55.49; H, 6.10; N, 14.69.

It is to be understood that the invention is not to be limited to the exact details shown and described, as obvious modifications and equivalents will be apparent to one skilled in the art, and the invention is therefore to be limited only by the scope of the appended claims.

We claim:

1. A compound selected from the group consisting of (2-furfurylbutyryl)urea and (2-furfurylpropionyl)urea.
2. (2-furfurylbutyryl)urea.
3. (2-furfurylpropionyl)urea.

References Cited in the file of this patent

UNITED STATES PATENTS 2,576,895　　Adelson ---------------- Nov. 27, 1951

OTHER REFERENCES

Spielman et al.: J.A.C.S., vol. 70, pp. 4189–91 (1948).